United States Patent
Yu

(10) Patent No.: US 9,053,298 B2
(45) Date of Patent: Jun. 9, 2015

(54) DATA TRANSMISSION SYSTEM USING OPTICAL FIBER

(75) Inventor: Wen-Ping Yu, Taipei County (TW)

(73) Assignee: AmTRAN TECHNOLOGY CO., LTD, New Taipei (TW)

( * ) Notice: Subject to any disclaimer, the term of this patent is extended or adjusted under 35 U.S.C. 154(b) by 631 days.

(21) Appl. No.: 13/353,781

(22) Filed: Jan. 19, 2012

(65) Prior Publication Data

US 2012/0114339 A1 May 10, 2012

Related U.S. Application Data

(63) Continuation of application No. 12/184,829, filed on Aug. 1, 2008, now abandoned.

(30) Foreign Application Priority Data

Jan. 4, 2008 (TW) .............................. 97100286 A

(51) Int. Cl.
*H04B 10/12* (2006.01)
*G06F 21/10* (2013.01)
*H04B 10/2575* (2013.01)
*H04B 10/032* (2013.01)

(52) U.S. Cl.
CPC .............. *G06F 21/10* (2013.01); *H04B 10/032* (2013.01); *H04B 10/25751* (2013.01)

(58) Field of Classification Search
CPC .. H04B 10/032; H04B 10/075; H04B 10/077; H04B 10/079; H04B 10/12; H04B 10/25; H04B 10/40; H04B 10/43; H04B 10/502; H04B 14/00; H04B 17/0082; H04B 2210/077; H04B 10/03; H04B 10/035; H04B 10/038; H04B 10/25751; H04J 14/00; H04J 14/0227; H04J 14/0234; H04J 14/0236; H04J 14/0272; H04J 14/0293; H04J 14/0297; H04J 14/0287; G06F 21/10

USPC ......... 398/141, 140, 142, 153, 154, 155, 139, 398/138, 135, 5, 4, 7–35, 182

See application file for complete search history.

(56) References Cited

U.S. PATENT DOCUMENTS

| 5,434,691 | A * | 7/1995 | Yamane ............................. 398/5 |
| 5,521,736 | A * | 5/1996 | Swirhun et al. ................ 398/154 |
| 5,615,035 | A * | 3/1997 | Koai ................................ 398/60 |
| 7,024,121 | B2 * | 4/2006 | Rikitake et al. ................ 398/154 |
| 2007/0019965 | A1 * | 1/2007 | Bercovici et al. ............. 398/154 |
| 2009/0190466 | A1 * | 7/2009 | Girardi et al. ................. 370/216 |

* cited by examiner

*Primary Examiner* — M. R. Sedighian
(74) *Attorney, Agent, or Firm* — Morris Manning & Martin LLP; Tim Tingkang Xia, Esq.

(57) ABSTRACT

A data transmission system using an optical fiber includes an optical fiber, a first light-emitting device, a second light-emitting device, a first photo-detecting device and a second photo-detecting device. Each of the first light-emitting device and the second light-emitting device is optically coupled to the input facet of the optical fiber, respectively. Each of the first photo-detecting device and the second photo-detecting device is optically coupled to the output facet of the optical fiber, respectively. In particular, the first light-emitting device and the second light-emitting device are packaged into a first optical subassembly, and the first photo-detecting device and the second photo-detecting device are packaged into a second optical subassembly.

18 Claims, 3 Drawing Sheets

DATA TRANSMISSION SYSTEM USING OPTICAL FIBER

CROSS-REFERENCE TO RELATED PATENT APPLICATIONS

This application is a continuation application of U.S. patent application Ser. No. 12/184,829, filed Aug. 1, 2008, entitled "DATA TRANSMISSION SYSTEM USING OPTICAL FIBER", by Wen-Ping YU, which itself claims priority to and the benefit of, pursuant to 35 U.S.C. §119(a), Taiwanese Patent Application No. 097100286, filed in Taiwan, R.O.C. on Jan. 4, 2008, which are hereby incorporated herein in their entireties by reference.

BACKGROUND OF THE INVENTION

1. Field of the Invention

The invention relates to a data transmission system using an optical fiber. More particularly, the data transmission system can be applied for HDCP (high-bandwidth digital content protection) applications through fewer parallel optical fibers.

2. Description of the Prior Art

HDCP is a digital rights management specification developed by Intel Corporation to protect digital entertainment traveled across DVI (digital visual interface) or HDMI (high definition multimedia interface) connections from being illegally copied. The HDCP specification provides a robust, cost-effective and transparent method for transmitting and receiving digital entertainment content through DVI/HDMI-compliant digital displays (e.g., high definition television or flat panel such as plasma, LCD and/or DLP, etc).

In general, HDCP encrypts the transmission of digital content between the video source and the digital display. And, HDCP is not designed for preventing the digital content from being copied or recorded per se, but rather designed for protecting the integrity of content during transmission. The video source or transmitter could be, for instance, a DVD player, a computer, or a set-up box. The digital display or receiver could be, for instance, a digital television, a monitor, or a projector. The implementation of HDCP requires an HDCP-enabled device which has a set of secret keys. During authentication, the receiving device will only accept content after it acknowledges the keys. To further protect the digital content, the transmitter and receiver generate a shared secret key value that is continuously checked throughout the transmission. After an authentication is established, the transmitter encrypts the data and sends it to the receiver for decryption.

High-bandwidth transmission of digital content is usually achieved by one of two means: shielded copper wires (such as coaxial cable) or fiber optic cable. The first generation of HDCP transmission systems was known of using parallel-shielded copper wire cables, such as DVI cables or HDMI cables. However, the bandwidth of this kind of cable has limitations in transmitting data. When the distance of transmission is elongated, the cost of the shielded copper wire cable will increase and the transmitted data will decay rapidly. In view of this fact, a multiple parallel optical fiber link was introduced between transmitters and receivers. Nevertheless, the multiple parallel optical fiber link traditionally employs multiple optical fibers for the HDCP applications.

For example, the traditional optical-fiber-based HDCP transmission system transmits TMDS (time minimized differential signal) from the video source or the transmitter to the digital displays through four optical fibers, and transmits data in the HDCP format through two optical fibers. However, for longer distance applications under the configurations, the cost of multiple parallel optical fibers is concerned, and the arrangement and maintenance of the multiple parallel optical fibers most certainly increase the loading.

SUMMARY OF THE INVENTION

To solve the problems above, one scope of the invention is to provide a data transmission system using an optical fiber.

According to an embodiment of the invention, the data transmission system includes an optical fiber, a first light-emitting device, a second light-emitting device, a first photo-detecting device, and a second photo-detecting device. Each of the first light-emitting device and the second light-emitting device is optically coupled to the input facet of the optical fiber, respectively. The first light-emitting device is for emitting a first data light signal into the input facet of the optical fiber. The second light-emitting device is for emitting a second data light signal into the input facet of the optical fiber. Each of the first photo-detecting device and the second photo-detecting device is optically coupled to the output facet of the optical fiber, respectively. The first photo-detecting device is for receiving the first data light signal transmitted over the optical fiber. The second photo-detecting device is for receiving the second data light signal transmitted over the optical fiber.

In particular, the first light-emitting device and the second light-emitting device are packaged into a first optical sub-assembly. The first photo-detecting device and the second photo-detecting device are packaged into a second optical sub-assembly.

According to another embodiment of the invention, it is related to a data transmission system of HDCP using optical fibers.

The data transmission system includes a first optical fiber, a second optical fiber, a third optical fiber, a first light-emitting device, a second light-emitting device, a third light-emitting device, a fourth light-emitting device, a fifth light-emitting device, a sixth light-emitting device, a seventh light-emitting device, an eighth light-emitting device, a first photo-detecting device, a second photo-detecting device, a third photo-detecting device, a fourth photo-detecting device, a fifth photo-detecting device, a sixth photo-detecting device, a seventh photo-detecting device, and an eighth photo-detecting device.

Each of the first optical fiber, the second optical fiber and the third optical fiber has a respective input facet and a respective output facet. The first light-emitting device and the second light-emitting device are optically coupled to the input facet of the first optical fiber, respectively. The first light-emitting device is for emitting a first data light signal associated with HDCP data into the input facet of the first optical fiber. The second light-emitting device is for emitting a second data light signal associated with the HDCP data into the input facet of the first optical fiber. The first photo-detecting device and the second photo-detecting device are optically coupled to the output facet of the first optical fiber, respectively. The first photo-detecting device is for receiving the first data light signal transmitted over the first optical fiber. The second photo-detecting device is for receiving the second data light signal transmitted over the first optical fiber. The third light-emitting device and the fourth light-emitting device are optically coupled to the input facet of the second optical fiber, respectively. The third light-emitting device is for emitting a third data light signal associated with the HDCP data into the input facet of the second optical fiber. The fourth light-emitting device is for emitting a first clock light signal associated with the HDCP data into the input facet of the second optical fiber. The third photo-detecting device and the fourth photo-detecting device are optically coupled to the output facet of the second optical fiber, respectively. The third photo-detecting device is for receiving the third data light signal transmitted over the second optical fiber. The fourth photo-detecting device is for receiving the first clock light signal transmitted over the second optical fiber.

The fifth light-emitting device and the fifth photo-detecting device are optically coupled to the input facet and the output facet of the third optical fiber, respectively. The fifth light-emitting device is for emitting a second clock light signal associated with the HDCP data into the input facet of the third optical fiber. The fifth photo-detecting device is for receiving the second clock light signal transmitted over the third optical fiber. The sixth light-emitting device and the sixth photo-detecting device are optically coupled to the output facet and the input facet of the third optical fiber, respectively. The sixth light-emitting device is for emitting, based on the second clock light signal, a first protection scheme light signal associated with the HDCP data into the output facet of the third optical fiber. The sixth photo-detecting device is for receiving the first protection scheme light signal transmitted over the third optical fiber. The seventh light-emitting device and the seventh photo-detecting device are optically coupled to the output facet and the input facet of the third optical fiber, respectively. The seventh light-emitting device is for emitting a third clock light signal associated with the HDCP data into the output facet of the third optical fiber. The seventh photo-detecting device is for receiving the third clock light signal transmitted over the third optical fiber. The eighth light-emitting device and the eighth photo-detecting device are optically coupled to the input facet and the output facet of the third optical fiber, respectively. The eighth light-emitting device is for emitting, based on the third clock light signal, a second protection scheme light signal associated with the HDCP data into the input facet of the third optical fiber. The eighth photo-detecting device is for receiving the second protection scheme light signal transmitted over the third optical fiber.

The advantage and spirit of the invention may be understood by the following recitations together with the appended drawings.

BRIEF DESCRIPTION OF THE APPFACETED DRAWINGS

DETAILED DESCRIPTION OF THE INVENTION

Figure 1A:
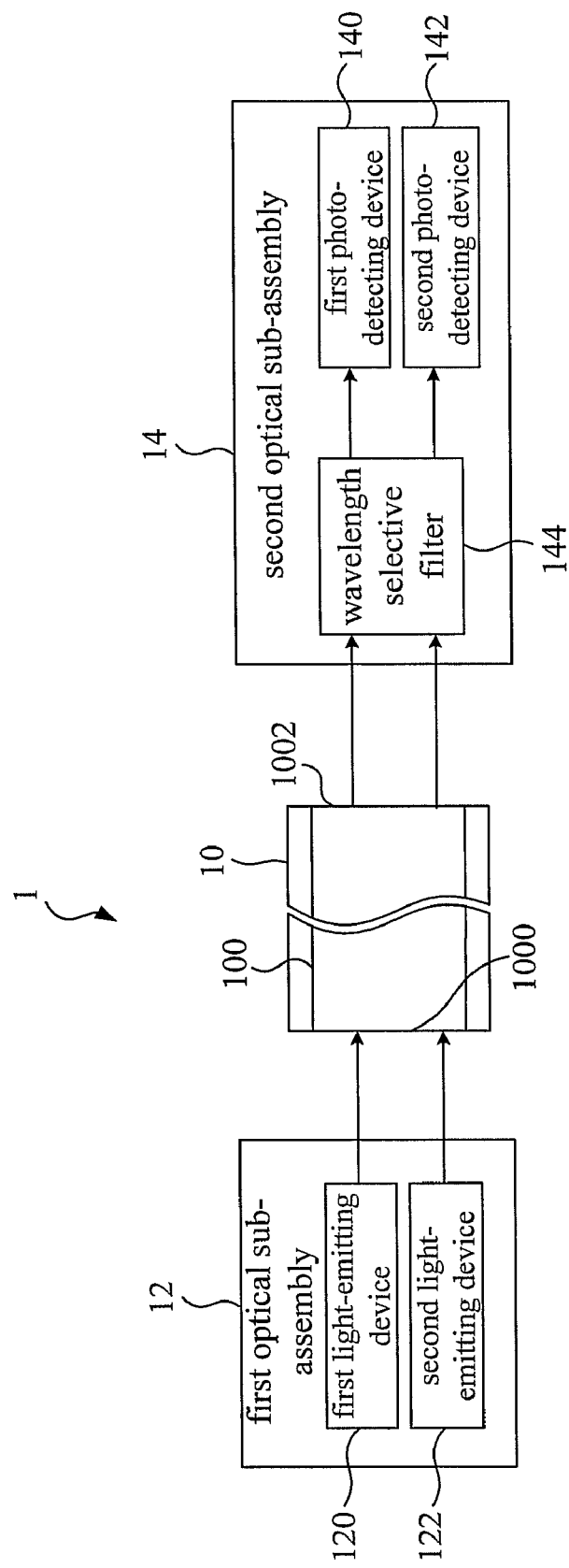
FIG. 1A is a function block diagram of a data transmission system using an optical fiber according to an embodiment of the invention.

Please refer to FIG. 1A. FIG. 1A is a function block diagram of a data transmission system 1 using an optical fiber 10 according to an embodiment of the invention.

As shown in FIG. 1A, the data transmission system 1 includes an optical fiber 10, a first light-emitting device 120, a second light-emitting device 122, a first photo-detecting device 140, and a second photo-detecting device 142. The optical fiber 10 includes a core 100 with an input facet 1000 and an output facet 1002. In practical applications, each of the first light-emitting device 120 and the second light-emitting device 122 can be a laser diode. For example, the laser diode can be a surface-emitting laser diode or an edge-emitting laser diode.

In addition, the wavelength of the light emitted by the first light-emitting device 120 or the second light-emitting device 122 can be within the range of 550 nm to 1650 nm. In the embodiment, the first light-emitting device 120 can be one laser diode emitting light with a 1310 nm wavelength, and the second light-emitting device 122 can be one laser diode emitting light with a 1550 nm wavelength.

Each of the first light-emitting device 120 and the second light-emitting device 122 is optically coupled to the input facet 1000 of the optical fiber 10, respectively. In particular, the first light-emitting device 120 and the second light-emitting device 122 are packaged into a first optical sub-assembly 12 which can have the structure of BOSA (bi-directional optical sub-assembly). The first light-emitting device 120 is for emitting a first data light signal into the input facet 1000 of the optical fiber 10. The second light-emitting device 122 is for emitting a second data light signal into the input facet 1000 of the optical fiber 10.

In practical applications, the first optical sub-assembly 12 can be included in an audio and high definition (HD) video mediator. For instance, in a home entertainment system application, the audio and high definition video mediator may be a DVD player, a computer, or a set-top box. Thus, the first data light signal and the second data light signal can be related to image data, like TMDS.

Each of the first photo-detecting device 140 and the second photo-detecting device 142 are optically coupled to the output facet 1002 of the optical fiber 10, respectively. Similarly, the first photo-detecting device 140 and the second photo-detecting device 142 are packaged into a second optical sub-assembly 14, such as a BOSA. The first photo-detecting device 140 is for receiving the first data light signal transmitted over the optical fiber 10. The second photo-detecting device 142 is for receiving the second data light signal transmitted over the optical fiber 10. In practical applications, the second optical sub-assembly 14 can be included in a high definition display panel and speaker system. For example, the high definition display panel and speaker system can be a high-definition or digital television, a monitor, or a projector.

As shown in FIG. 1A, the data transmission system 1 according to the invention can further include a wavelength selective filter 144 optically coupled to the output facet 1002 of the optical fiber 10, the first photo-detecting device 140 and the second photo-detecting device 142. In the embodiment, the wavelength selective filter 144 allows the first data light signal with a 1310 nm wavelength to go through and then be received by the first photo-detecting device 140. Instead, the second data light signal with a 1550 nm wavelength can be reflected by the wavelength selective filter 144 and then received by the second photo-detecting device 142.

Figure 1B:
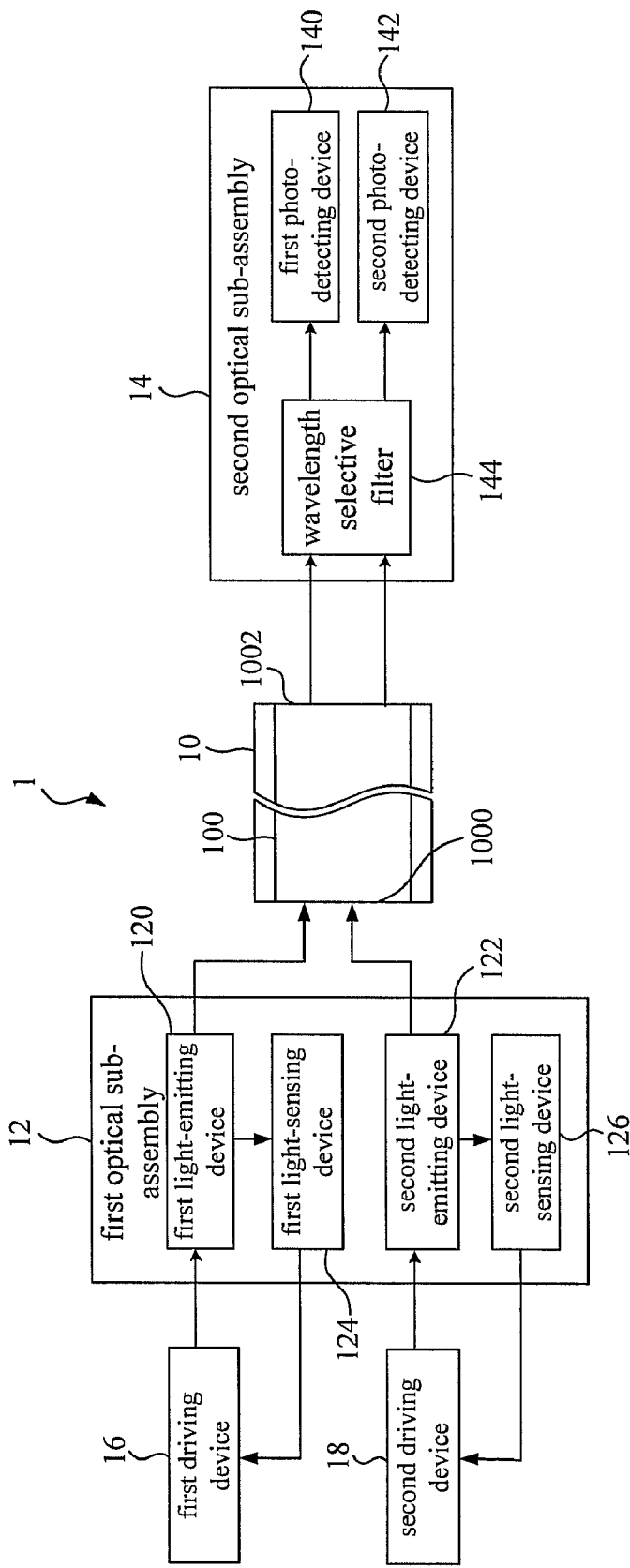
FIG. 1B is a function block diagram of the data transmission system in FIG. 1A further including a light-sensing device.

In one embodiment, in order to provide a temperature compensation function, the data transmission system 1 according to the invention can further include a first light-sensing device 124 and a second light-sensing device 126, as shown in FIG. 1B. The first light-sensing device 124 is for sensing the light intensity of the first light-emitting device 120, and the second light-sensing device 126 is for sensing the light intensity of the second light-emitting device 122.

Theoretically, the first light-sensing device 124, for instance, is used to observe the light intensity of the first light-emitting device 120. Then, one sensed signal, relevant to the light intensity, sensed by the first light-sensing device 124 is feedbacked to a first driving device 16 such that the first driving device 16 can adjust a driving current thereof, based on the sensed signal, to drive the first light-emitting device 120. Similarly, a second driving device 18 can adjust a driving current thereof, based on the other sensed signal relevant to the light intensity of the second light-emitting device 122 and sensed by the second light-sensing device 126, to drive the second light-emitting device 122.

In one embodiment, if the first light-emitting device 120, for instance, is a surface-emitting laser diode, the first optical sub-assembly 12 can further include a reference light-emitting device and a reflecting device (both not shown in FIG. 1B). The light intensity of the reference light-emitting device is substantially the same as that of the first light-emitting device 120. The light emitted by the reference light-emitting device can be reflected by the reflecting device and then be received by the first light-sensing device 124. Later, the first driving device 16 can adjust a driving current thereof, based on a sensed signal relevant to the light intensity of the reference light-emitting device and sensed by the first light-sensing device 124, to drive the first light-emitting device 120. In another embodiment, if the first light-emitting device 120 is an edge-emitting laser diode, the first light-sensing device 124 can just be disposed near the light-emission side of the first light-emitting device 120 to sense its light intensity.

Figure 2:
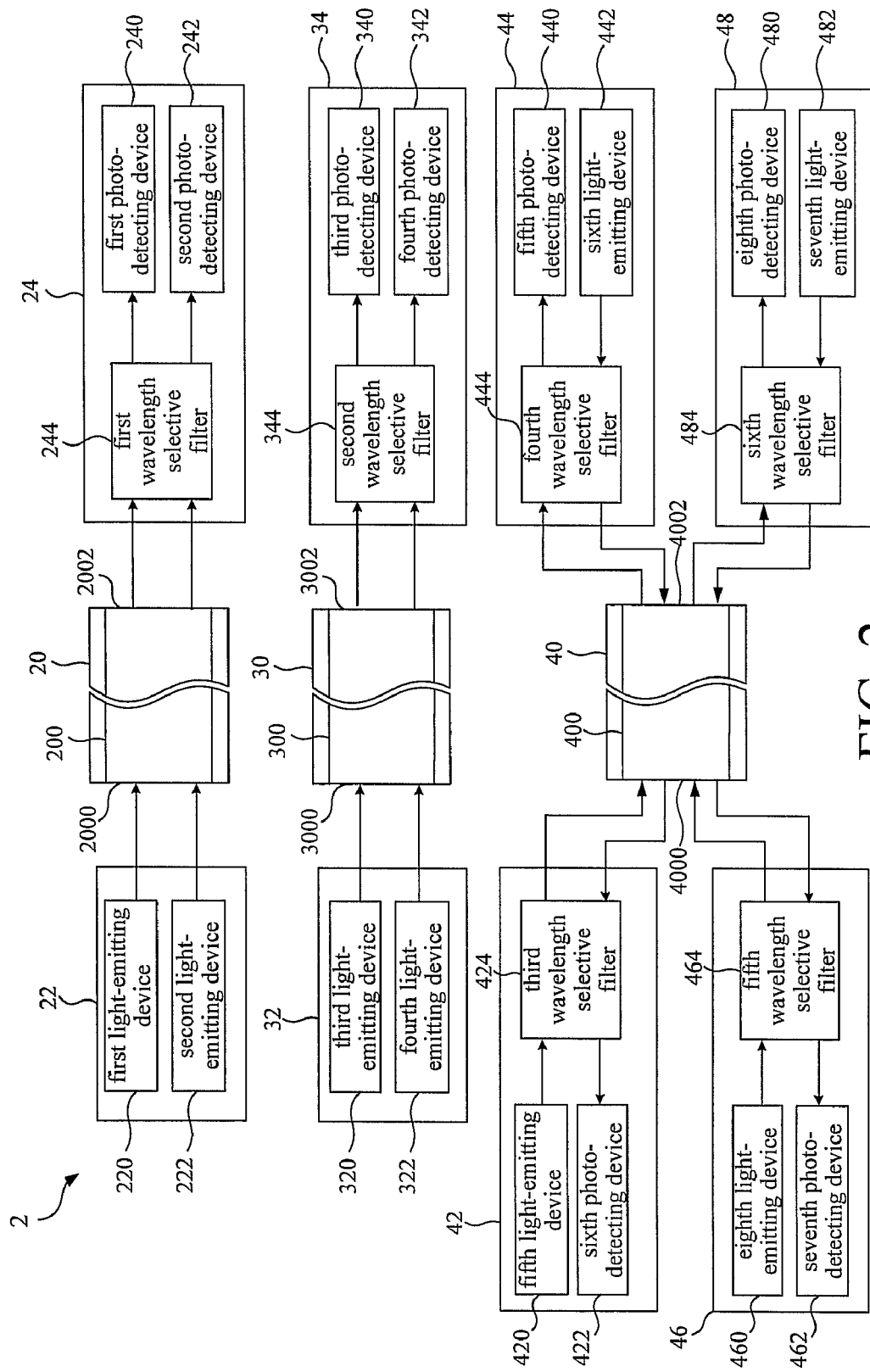
FIG. 2 is a function block diagram of a data transmission system using optical fibers according to another embodiment of the invention.

Please refer to FIG. 2. FIG. 2 is a function block diagram of a data transmission system 2 using optical fibers according to another embodiment of the invention.

As shown in FIG. 2, the data transmission system 2 includes a first optical fiber 20, a second optical fiber 30, a third optical fiber 40, a first light-emitting device 220, a second light-emitting device 222, a third light-emitting device 320, a fourth light-emitting device 322, a fifth light-emitting device 420, a sixth light-emitting device 442, a seventh light-emitting device 482, an eighth light-emitting device 460, a first photo-detecting device 240, a second photo-detecting device 242, a third photo-detecting device 340, a fourth photo-detecting device 342, a fifth photo-detecting device 440, a sixth photo-detecting device 422, a seventh photo-detecting device 462, and an eighth photo-detecting device 480. The light emitted by each of the light-emitting devices from the first one to the eighth one may have wavelengths within the range of 550 nm to 1650 nm. In practical applications, each of the light-emitting devices from the first one to the eighth one can be a laser diode.

The first optical fiber 20, the second optical fiber 30 and the third optical fiber 40 have a respective core (200, 300, and 400) with a respective input facet (2000, 3000, and 4000) and a respective output facet (2002, 3002, and 4002). The first light-emitting device 220 and the second light-emitting device 222 are optically coupled to the input facet 2000 of the first optical fiber 20, respectively. In the embodiment, the first light-emitting device 220 can be one laser diode emitting light with a 1310 nm wavelength, and the second light-emitting device 222 can be one laser diode emitting light with a 1550 nm wavelength. The first light-emitting device 220 is for emitting a first data light signal associated with HDCP data into the input facet 2000 of the first optical fiber 20. The second light-emitting device 222 is for emitting a second data light signal associated with the HDCP data into the input facet 2000 of the first optical fiber 20. In the embodiment, the first light-emitting device 220 and the second light-emitting device 222 are packaged into a BOSA 22.

The first photo-detecting device 240 and the second photo-detecting device 242 are optically coupled to the output facet 2002 of the first optical fiber 20, respectively.

The first photo-detecting device 240 is for receiving the first data light signal transmitted over the first optical fiber 20. The second photo-detecting device 242 is for receiving the second data light signal transmitted over the first optical fiber 20. In the embodiment, the first photo-detecting device 240 and the second photo-detecting device 242 are packaged into a BOSA 24.

The third light-emitting device 320 and the fourth light-emitting device 322 are optically coupled to the input facet 3000 of the second optical fiber 30, respectively. In the embodiment, the third light-emitting device 320 can be one laser diode emitting light with a 1310 nm wavelength, and the fourth light-emitting device 322 can be one laser diode emitting light with a 1550 nm wavelength. The third light-emitting device 320 is for emitting a third data light signal associated with the HDCP data into the input facet 3000 of the second optical fiber 30. The fourth light-emitting device 322 is for emitting a first clock light signal associated with the HDCP data into the input facet 3000 of the second optical fiber 30. In the embodiment, the third light-emitting device 320 and the fourth light-emitting device 322 are packaged into a BOSA 32.

In practical applications, the first data light signal, the second data light signal, the third data light signal and the first clock light signal can be related to image data, like TMDS. For example, the first data light signal, the second data light signal, the third data light signal and the first clock light signal may be TMDS0, TMDS1, TMDS2 and TMDSC, respectively.

The third photo-detecting device 340 and the fourth photo-detecting device 342 are optically coupled to the output facet 3002 of the second optical fiber 30, respectively. The third photo-detecting device 340 is for receiving the third data light signal transmitted over the second optical fiber 30. The fourth photo-detecting device 342 is for receiving the first clock light signal transmitted over the second optical fiber 30. In the embodiment, the third photo-detecting device 340 and the fourth photo-detecting device 342 are packaged into a BOSA 34.

The fifth light-emitting device 420 and the fifth photo-detecting device 440 are optically coupled to the input facet 4000 and the output facet 4002 of the third optical fiber 40, respectively. The fifth light-emitting device 420 is for emitting a second clock light signal associated with the HDCP data into the input facet 4000 of the third optical fiber 40. The second clock light signal can be an SCL (serial clock line) signal. The fifth photo-detecting device 440 is for receiving the second clock light signal transmitted over the third optical fiber 40.

The sixth light-emitting device 442 and the sixth photo-detecting device 422 are optically coupled to the output facet 4002 and the input facet 4000 of the third optical fiber 40, respectively. The sixth light-emitting device 442 is for emitting, based on the second clock light signal, a first protection scheme light signal associated with the HDCP data into the output facet 4002 of the third optical fiber 40. The first protection scheme light signal can be an SDA (serial data line) signal. The sixth photo-detecting device 422 is for receiving the first protection scheme light signal transmitted over the third optical fiber 40. In practical applications, the wavelength of the first protection scheme light signal can be within the range of 550 nm to 1650 nm.

In the embodiment, the fifth light-emitting device 420 and the sixth photo-detecting device 422 are packaged into a BOSA 42. And, the sixth light-emitting device 442 and the fifth photo-detecting device 440 are packaged into a BOSA 44.

The seventh light-emitting device 482 and the seventh photo-detecting device 462 are optically coupled to the output facet 4002 and the input facet 4000 of the third optical fiber 40, respectively. The seventh light-emitting device 482 is for emitting a third clock light signal associated with the HDCP data into the output facet 4002 of the third optical fiber 40. The third clock light signal can be an SCL signal. The seventh photo-detecting device 462 is for receiving the third clock light signal transmitted over the third optical fiber 40.

The eighth light-emitting device 460 and the eighth photo-detecting device 480 are optically coupled to the input facet 4000 and the output facet 4002 of the third optical fiber 40, respectively. The eighth light-emitting device 460 is for emitting, based on the third clock light signal, a second protection scheme light signal associated with the HDCP data into the input facet 4000 of the third optical fiber 40. The second protection scheme light signal can be an SDA signal. The eighth photo-detecting device 480 is for receiving the second protection scheme light signal transmitted over the third optical fiber 40. Similarly, the second protection scheme light signal may have wavelength within the range of 550 nm to 1650 nm. In the embodiment, the eighth light-emitting device 460 and the seventh photo-detecting device 462 are packaged into a BOSA 46. And, the seventh light-emitting device 482 and the eighth photo-detecting device 480 are packaged into a BOSA 48.

As shown in FIG. 2, the data transmission system 2 according to the invention can further include a first wavelength selective filter 244 and a second wavelength selective filter 344. The first wavelength selective filter 244 is optically coupled to the output facet 2002 of the first optical fiber 20, the first photo-detecting device 240 and the second photo-detecting device 242. The second wavelength selective filter 344 is optically coupled to the output facet 3002 of the second optical fiber 30, the third photo-detecting device 340 and the fourth photo-detecting device 342. For example, the first wavelength selective filter 244 is designed such that the first data light signal with a 1310 nm wavelength can be received by the first photo-detecting device 240, but the second data light signal with a 1550 nm wavelength can be received by the second photo-detecting device 242.

Moreover, the data transmission system 2 according to the invention can further includes a third wavelength selective filter 424, a fourth wavelength selective filter 444, a fifth wavelength selective filter 464, and a sixth wavelength selective filter 484. The third wavelength selective filter 424 is optically coupled to the input facet 4000 of the third optical fiber 40, the fifth light-emitting device 420 and the sixth photo-detecting device 422. The fourth wavelength selective filter 444 is optically coupled to the output facet 4002 of the third optical fiber 40, the sixth light-emitting device 442 and the fifth photo-detecting device 440. The fifth wavelength selective filter 464 is optically coupled to the input facet 4000 of the third optical fiber 40, the eighth light-emitting device 460 and the seventh photo-detecting device 462. The sixth wavelength selective filter 484 is optically coupled to the output facet 4002 of the third optical fiber 40, the seventh light-emitting device 482 and the eighth photo-detecting device 480.

For example, the second clock light signal with a 1310 nm wavelength emitted by the fifth light-emitting device 420 can go through the third wavelength selective filter 424 to the input facet 4000 of the third optical fiber 40, but the first protection scheme light signal with a 1550 nm wavelength emitted by the sixth light-emitting device 442 can be reflected by the third wavelength selective filter 424 and then received by the sixth photo-detecting device 422.

In one embodiment, in order to provide a temperature compensation function, the data transmission system 2 according to the invention can further include a first light-sensing device, a second light-sensing device, a third light-sensing device, and a fourth light-sensing device (not shown in FIG. 2), for sensing the light intensity of the first light-emitting device 220, the second light-emitting device 222, the third light-emitting device 320, and the fourth light-emitting device 322, respectively. The arrangement and theory of light-sensing devices are described above and therefore will not be repeated again.

Compared to the prior art, the data transmission system according to the invention just utilizes only two optical fibers for transmitting TMDS signals and one optical fiber for transmitting data with the HDCP format. Thereby, for longer distance applications under the configurations, the data transmission system according to the invention certainly reduces the cost effectively and makes it more convenient for arranging and maintaining the parallel optical fibers.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for high-bandwidth digital content protection data transmission, the method comprising steps of:
   receiving a first data light signal from a first optical connector by a first photo detecting device;
   receiving a first clock light signal with a first wavelength from a second optical connector by a second photo detecting device;
   generating and transmitting a first protection scheme light signal with a second wavelength to the second optical connector by a first light-emitting device, wherein the first wavelength and the second wavelength are different;
   receiving a second data light signal from a third optical connector by a fourth photo detecting device;
   receiving the first protection scheme light signal with the second wavelength from the second optical connector by a third photo detecting device;
   generating and transmitting a second protection scheme light signal with a third wavelength from the second optical connector by a sixth light-emitting device; and
   receiving the second protection scheme light signal from the second optical connector by a sixth photo detecting device, wherein the first wavelength, the second wavelength, and the third wavelength are different.

2. The method of claim 1, further comprising the step of:
   receiving the first protection scheme light signal from the second optical connector by the third photo detecting device; and
   generating and transmitting the first clock light signal to the second optical connector by a second light-emitting device.

3. The method of claim 1, wherein the first clock light signal is a serial clock line signal, and the first protection scheme light signal is a serial data line signal.

4. The method of claim 1, further comprising the step of:
   receiving a second clock light signal from a third optical connector by a fifth photo detecting device.

5. The method of claim 1, further comprising the steps of:
   generating the first data light signal to the first optical connector by a third light-emitting device; and
   sensing a light intensity of the first light-emitting device and adjusting a driving current of the first light-emitting device based on the sensed light intensity.

6. A high-bandwidth digital content protection data transmission apparatus, adapted to connecting with a first optical connector and a second optical connector, the high-bandwidth digital content protection data transmission apparatus comprising:
- a first photo detecting device, for receiving a first data light signal from the first optical connector;
- a second photo detecting device, for receiving a first clock light signal with a first wavelength from the second optical connector;
- a first light-emitting device, for generating and transmitting a first protection scheme light signal with a second wavelength to the second optical connector, wherein the first wavelength and the second wavelength are different; and
- a first wavelength selective filter, coupled to the first light-emitting device and the second photo-detecting device, filtering the first protection scheme light signal transmitted to the second optical connector or the first clock light signal received from the second optical connector.

7. The high-bandwidth digital content protection data transmission apparatus of claim 6, further comprising:
- a third photo detecting device, for receiving the first protection scheme light signal from the second optical connector; and
- a second light-emitting device, for generating and transmitting the first clock light signal to the second optical connector.

8. The high-bandwidth digital content protection data transmission apparatus of claim 6, wherein the first clock is a serial clock line signal and the first protection scheme is a serial data line signal.

9. The high-bandwidth digital content protection data transmission apparatus of claim 6, further comprising:
- a fourth photo detecting device, for receiving a second data light signal from a third optical connector.

10. The high-bandwidth digital content protection data transmission apparatus of claim 6, further comprising:
- a fifth photo detecting device, for receiving a second clock light signal from a third optical connector.

11. The high-bandwidth digital content protection data transmission apparatus of claim 6, further comprising:
- a third photo detecting device, for receiving the first protection scheme light signal with the second wavelength from the second optical connector;
- a sixth light-emitting device, for generating and transmitting a second protection scheme light signal with a third wavelength to the second optical connector; and
- a sixth photo detecting device, for receiving the second protection scheme light signal from the second optical connector, wherein the first wavelength, the second wavelength, and the third wavelength are different.

12. The high-bandwidth digital content protection data transmission apparatus of claim 6, further comprising:
- a third light-emitting device for generating and transmitting the first data light signal to the first optical connector; and
- a first light-sensing device, for sensing a light intensity of the first light-emitting device and adjusting a driving current of the first light-emitting device based on the sensed light intensity.

13. A data transmission system using optical fibers, comprising:
- a first optical connector;
- a second optical connector;
- a first photo detecting device, for receiving a first data light signal from the first optical connector;
- a second photo detecting device, for receiving a first clock light signal with a first wavelength from the second optical connector;
- a first light-emitting device, for generating and transmitting a first protection scheme light signal with a second wavelength to the second optical connector, wherein the first wavelength and the second wavelength are different;
- a first wavelength selective filter, coupled to the first light-emitting device and the second photo-detecting device, filtering the first protection scheme light signal transmitted to the second optical connector or the first clock light signal received from the second optical connector;
- a third light-emitting device, for generating and transmitting the first data light signal to the first optical connector;
- a third photo detecting device, for receiving the first protection scheme light signal from the second optical connector; and
- a second light-emitting device, for generating and transmitting the first clock light signal to the second optical connector.

14. The data transmission system using optical fibers of claim 13, wherein the first clock is a serial clock line signal and the first protection scheme is a serial data line signal.

15. The data transmission system using optical fibers of claim 13, further comprising:
- a third optical connector;
- a fourth light-emitting device, for generating and transmitting a second data light signal to the third optical connector; and
- a fourth photo detecting device, for receiving the second data light signal from the third optical connector.

16. The data transmission system using optical fibers of claim 13, further comprising:
- a third optical connector;
- a fifth light-emitting device, for generating and transmitting a second clock light signal to the third optical connector; and
- a fifth photo detecting device, for receiving the second clock light signal from the third optical connector.

17. The data transmission system using optical fibers of claim 13, further comprising:
- a sixth light-emitting device, for generating and transmitting a second protection scheme light signal with a third wavelength from the second optical connector; and
- a sixth photo detecting device, for receiving the second protection scheme light signal from the second optical connector, wherein the first wavelength, the second wavelength, and the third wavelength are different.

18. The data transmission system using optical fibers of claim 13, further comprising:
- a first light-sensing device for sensing a light intensity of the third light-emitting device and adjusting a driving current of the third light-emitting device based on the sensed light intensity.

* * * * *